April 19, 1949. C. W. CHERRY 2,467,610
RIVET STEM PULLER AND CUTTER
Filed March 31, 1945 2 Sheets-Sheet 1
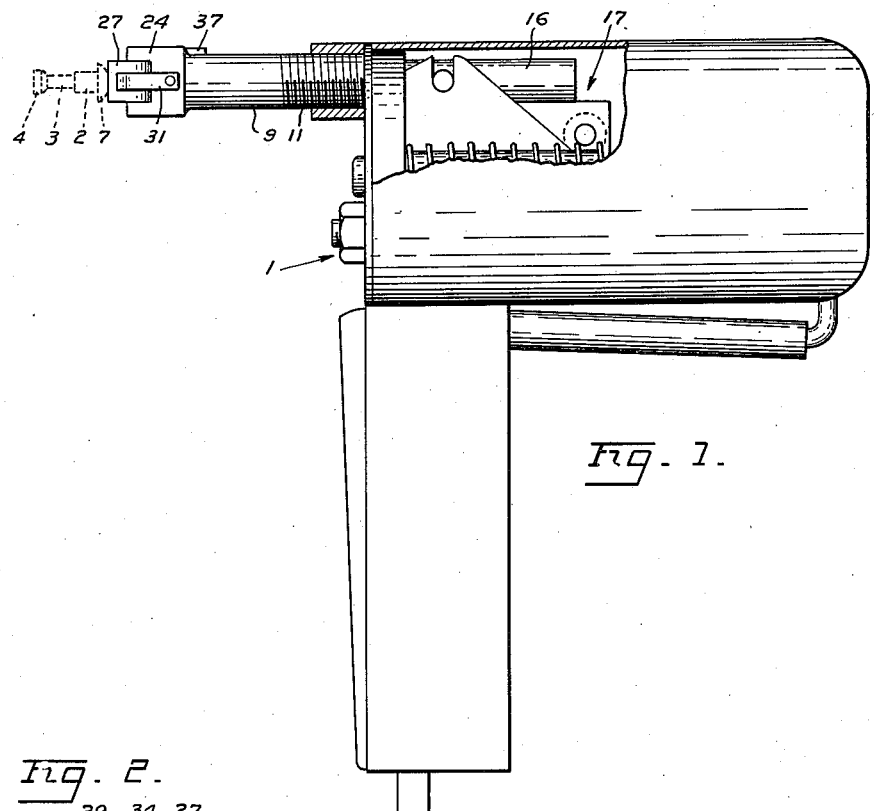
Fig. 1.
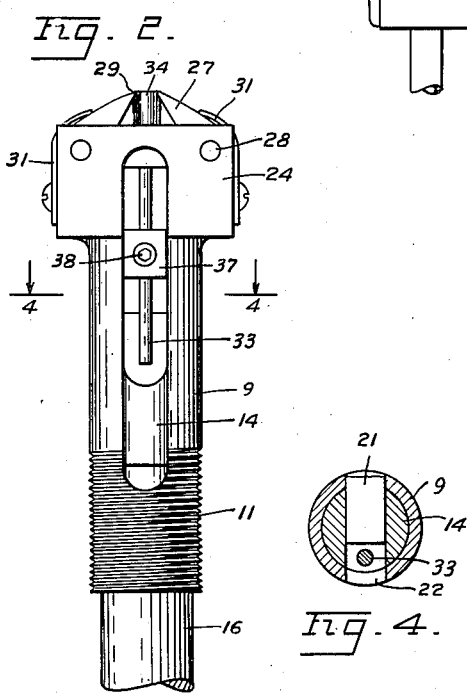
Fig. 2.
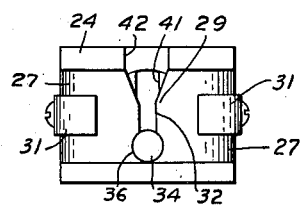
Fig. 3.
Fig. 4.
INVENTOR.
CARL W. CHERRY
BY George B White
ATTORNEY April 19, 1949.   C. W. CHERRY   2,467,610
RIVET STEM PULLER AND CUTTER
Filed March 31, 1945   2 Sheets-Sheet 2

INVENTOR.
CARL W. CHERRY
BY George B. White
ATTORNEY

Patented Apr. 19, 1949

2,467,610

UNITED STATES PATENT OFFICE 2,467,610

RIVET STEM PULLER AND CUTTER

Carl W. Cherry, Carmel, Calif.; Lena Cherry administratrix of said Carl W. Cherry deceased Application March 31, 1945, Serial No. 585,979

11 Claims. (Cl. 218—19)

1

This invention relates to a riveting tool, and particularly to a riveting tool for applying or setting rivets of the type in which a stem is assembled in a tubular rivet and is provided with means thereon for upsetting the tail end of the rivet when the stem is pulled through said tubular rivet.

An object of this invention is to provide a riveting tool which will pull the stem through a tubular rivet in such a way as to form the tail of the rivet and fasten the rivet in place, and also to trim or cut the stem adjacent the head of the rivet in the same operation.

Features of this invention are: the provision of cutting elements on the pressure head of a riveting tool for cutting into the stem extended through a tubular rivet after the stem is pulled to a stroke sufficiently long to form the tail of the rivet against the inside of the work to be riveted; the control of the cutting element in such a manner that if applied to the stem shortly prior to the completion of the riveting stroke, they will shear some of the material from the opposite sides of the rivet stem against the head of the rivet, thereby providing a retaining head to assist in holding in place the stem portions remaining in the tubular rivet; the arrangement of the cutting elements on the pressure head so that the reactive opposite forces applied to the rivet head and the stem by the pulling and pressure elements of the tool are utilized to force the cutting elements into the rivet stem; the controlling of the operation of the cutting elements so as to keep them spaced until after a desirable stroke of movement of the stem through the tubular rivet and to apply the cutting elements after a predetermined stroke.

I am aware that some changes may be made in the general arrangements and combinations of the several devices and parts, as well as in the details of the construction thereof without departing from the scope of the present invention as set forth in the following specification and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

2

Fig. 1 is a side view partly broken away of a so-called riveting "gun" with a riveting tool attached to the same, said riveting tool being constructed in accordance with the herein invention.

Fig. 2 is a side view of the riveting tool.

Fig. 3 is a view of the rivet-abutting end of the riveting tool.

Fig. 4 is a sectional view taken on the lines 4—4 of Fig. 2.

Figure 5:
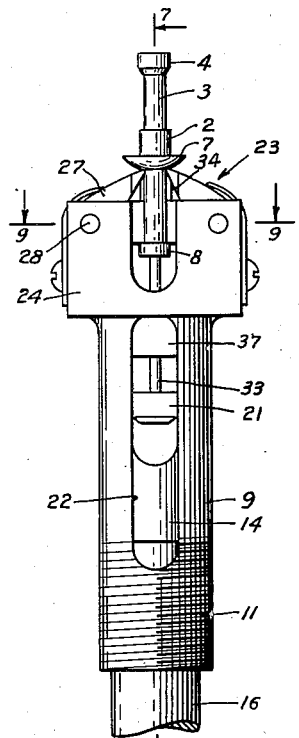
Fig. 5 is a side view of the tool applied to a rivet assembly.
Figure 6:
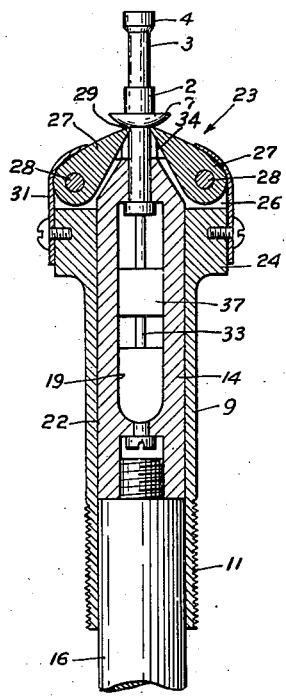
Fig. 6 is a sectional view of the tool applied to said rivet assembly.
Figure 7:
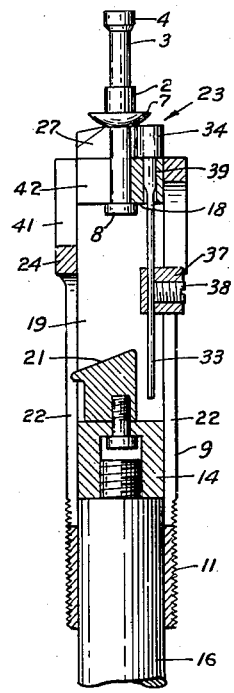
Fig. 7 is another sectional view of the tool applied to the rivet assembly, the section being taken on lines 7—7 of Fig. 5.

Referring to Fig. 1, my riveting tool is shown attached to a so-called pneumatic riveting gun 1 of the type shown in my Patent No. 2,343,278, issued March 7, 1944, on Riveting device. In the illustration as shown in broken lines in Fig. 1 and in full lines in Figs. 6, 7 and 8 my tool is shown as applied and adapted to the type of rivet shown in my Patent No. 2,183,543, issued December 19, 1939, on Rivet and method of applying same. It is to be understood, however, that my tool can be readily used in connection with any riveting apparatus or riveting "gun" whether such apparatus be operated pneumatically, electrically, manually or otherwise. It is to be further understood that my riveting tool can be readily adapted for use in connection with various types of so-called "blind" rivets, namely of the type where a stem is extended through the tubular rivet and is pulled through the same so as to form the tail of the rivet in such a manner that the rivet can be set from one side of the work without the need for access to both sides of the work to be riveted.

Figure 8:
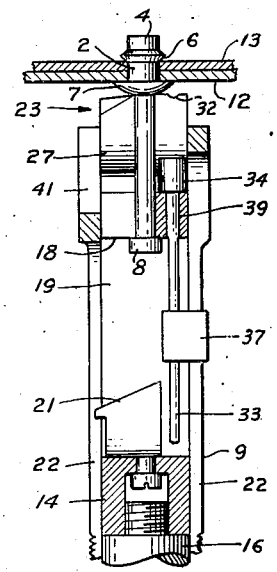
Fig. 8 is a sectional view of the tool after the stem in the rivet has been pulled for forming the tail.
Figure 9:
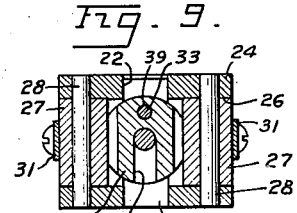
Fig. 9 is a sectional view taken on lines 9—9 of Fig. 5.

In the herein illustrative form, the tool is particularly adapted to rivets wherein a tubular sleeve or rivet 2 has a stem 3 extended therethrough, and in which the tail end of the stem has a tail 4 formed on it for spreading the tail end of the rivet 2 into a tail 6 as shown in Fig. 8. The tubular rivet 2 may have a suitable head 7 thereon, and the end of the stem 3 which extends beyond the rivet head 7 has suitable engagement means for applying a pulling force to the stem 3, in this illustration a pulling head 8.

The riveting tool includes a tubular sleeve 9 adapted to be attached to the casing of the riveting gun 1 in the manner shown in Fig. 1, for instance by threads 11. Thus tubular sleeve 9 operates as the pressure element of the tool, namely it transmits the reactive force from the casing of the gun 1 to the rivet head 7 for holding said rivet head 7 against the outer face 12 of the work 13 which in Fig. 8 is shown as constituting plates to be riveted together. Inside the tubular sleeve 9 works a draw bolt 14 which forms the pulling element of the tool. This draw bolt 14 is suitably connected to a plunger 16, which latter in turn is connected to a suitable mechanism 17 inside the gun 1 for pulling said plunger 16 and said draw bolt 14 for the purpose of performing the riveting operation.

The end of the draw bolt 14 is provided with a shoulder 18 for engagement with the underside of the pulling head 8 of the rivet stem 3. An intermediate portion of the draw bolt 14 has a slot 19 therethrough beginning at said shoulder 18. A guide 21 in the bottom of the slot 19 facilitates the release of the broken portion of the stem 3 from the tool. For this purpose, the outer sleeve 9 also has longitudinal slots 22 in its opposite sides aligned with the slot 19 of the draw bolt 14.

The primary novelty of the invention resides in the provision of a combined pressure and cutting head 23 formed on the pressure element or sleeve 9. This pressure and cutting head 23 includes a bracket head 24 formed on the outer end of the sleeve 9. A slot 26 is provided across the top of the head 24. A pair of cutting blades 27 are fulcrumed on pivots 28 which latter in turn are supported in the opposite walls of the slot 26. The pivots 28 are on the opposite sides of the draw bolt 14 and are spaced from each other. The cutting blades 27 taper to a cutting edge 29 and converge toward the center line of the tool. A leaf spring 31 at each end of the slot 26 is mounted on the bracket 24 and is curved over to adjacent blade 27 so as to urge the blade 27 inwardly and toward each other and to resist the outward swinging of said blades 27.

A spacer pin 33 is slidably extended through the top of the draw bolt 14 and has a spacer head 34 thereon which fits into arcuate indents 36 (Fig. 3) in the opposite cutting edges 29 of the blades 27 so as to hold the cutting edges 29 apart and out of contact with the stem 3. The pin 33 extends into the slot 19 of the draw bolt 14 and it has a tripping abutment 37 adjustably mounted thereon by any suitable means such as a set screw 38. The spacer pin 33 is slidable through a hole 39 in the top of the draw bolt 14 to allow relative movement of the draw bolt prior to the tripping of the spacer pin 33. The tripping abutment 37 is guided in the slot 22 of the outer sleeve 9.

Figure 11:
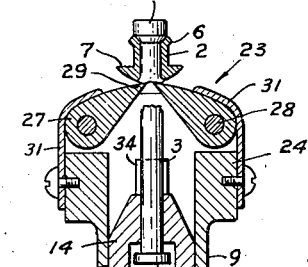
Fig. 10 is a fragmental sectional view showing the initial penetration of the cutting blades into the sides of the stem and Fig. 11 is a fragmental sectional view showing the cutting and trimming of the rivet stem by said tool.

It is to be noted that the shape of the cutting blades 27 and the cutting edges 29 may be varied in accordance with the type of rivet head to which pressure is applied by the pressure head through these cutting blades 27, and in accordance with the type of cut desired. In the present illustration the cutting edges 29 of the blades 27 project toward the end of the tool beyond said fulcrum pivots 28. The pressure exerted on the blades 27 at the cutting edges 29 by the pressing of the outer sleeve 9 toward the rivet head 7, and the added friction of engagement between the cutting edges 29 and the sides of the stem 3 when the two blades are freed, produces a turning moment on said blades 27 to force their cutting edges 29 toward each other and into said rivet stem 3 toward the ultimate closed cutting position shown in Fig. 11. This pressure in that direction is applied through the pivots 28 around which the cutting movement of the blades 27 is fulcrumed.

Figure 10:
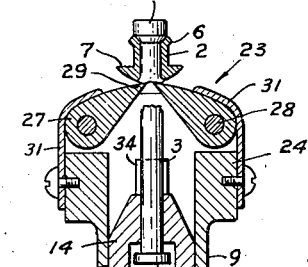

In operation, the tool is connected to the gun 1. Then a rivet assembly is inserted in the tool. In the present illustration aligned lateral slots 41 and 42 are provided between the blades 27 respectively in the pressure head 24 and in the top of the draw bolt 14 to permit the side wise insertion of the type of rivets for which the illustrative form of this tool is designed, as particularly shown in Fig. 7. The spacer 34 normally holds the blades apart a distance slightly in excess of the diameter of stem 3. Suitable power is then applied to the gun 1 which pulls the draw bolt 14 and exerts a reactive pressure on the casing 9, the pressure head 24 and on the blades 27 so as to hold the rivet head 7 tightly against the outer surface 12 of the work 13. After the stem 3 is pulled the distance necessary for upsetting or forming the tail 6 against the inside surface of the work 13, the shoulder 18 reaches the tripping abutment 37 and pushes the same downwardly and thereby pulls the spacer head 34 from between the cutting edges 29, where it has been held by the pressure of springs 31, and releases said cutting edges 29 for engagement with the opposite sides of the stem 3 adjacent the rivet head 7. As the stem 3 continues to be pulled the cutting edges 29 penetrate into the opposite side of said stem 3 and the accompanying short elongation or movement of the stem 3 causes the shaving of a certain amount of material from the opposite sides of the stem 3 and compresses the shaved material against the rivet head so as to form a small retaining head on the cut end of the stem 3 in the manner shown in Fig. 10. Further pressure exerted on the cutting blades 27 and continued pull on the stem 3 forces the cutting edges 29 deeper into the stem 3 and weakens the stem 3 at the point where the cutting blades penetrate, until the cutting edges 29 are forced through the stem 3 and cut the same. In some instances the pulling of the stem will break the stem at the point of weakening caused by the cutting edges 29 penetrating into the material of the stem 3 before the blades completely cut through the stem 3. At any rate, the stem 3 is always broken off at a point immediately adjacent the rivet head 7 and thereby separate trimming of the protruding portion of the stem 3 is obviated. The material crowded against the rivet head 7 during the initial operation of the cutting blades 29 and before the breaking of the stem 3, provides additional means for holding in place the portion of the stem left within the tubular rivet. The broken portion of the stem 3 falls into the slot 19 of the draw bolt 14 and is guided by the guide 21 out through the side slot 22 of the pressure sleeve 9. The draw bolt 14 is returned to its initial position in the manner described in my aforesaid previous patent and by the operation of the gun. The returning movement of the draw bolt 14 carries with it and pushes the spacer head 34 between the cutting edges 29 of the cutting blades 28 as shown in Fig. 2. In this adjustment the tool is ready to receive another rivet assembly for the next riveting operation.

I claim:

1. In a riveting apparatus for setting a rivet assembly of the type in which a stem with a tail former on it is assembled in a tubular rivet and is extended beyond the rivet head, the combination with relatively movable pulling and pressure elements of said apparatus, of cutting elements on the pressure element for cutting the extended portion of said stem, releasable means to hold said cutting elements inoperative during a portion of the pulling stroke of said pulling element, and a tripping mechanism to release said cutting elements after said portion of the pulling stroke of said pulling element.

2. In a riveting apparatus for setting a rivet assembly of the type in which a stem with a tail former on it is assembled in a tubular rivet and is extended beyond the rivet head, the combination with relatively movable pulling and pressure elements of said apparatus, of cutting elements on the pressure element for cutting the extended portion of said stem, releasable means to hold said cutting elements inoperative during a portion of the pulling stroke of said pulling element, and a tripping mechanism actuated by said pulling element at the end of said portion of said pulling stroke to release said cutting element for cutting said stem.

3. In a riveting apparatus for setting rivets of the type in which a stem is extended through a tubular rivet, the stem having a tail former at one end and having its other end extended beyond the rivet head, the combination with pulling and the pressure elements of said apparatus, of opposed cutting blades fulcrumed on the pressure element and converging with their cutting edges toward said stem, a releasable spacer device for holding the cutting edges of said blades out of contact with said stem, and a tripping mechanism to release said cutting blades from said spacer device at the end of a predetermined pulling stroke of said pulling element.

4. In a riveting apparatus for setting rivets of the type in which a stem is extended through a tubular rivet, the stem having a tail former at one end and having its other end extended beyond the rivet head, the combination with a pulling element and a pressure element of said apparatus, of opposed cutting blades fulcrumed on the pressure element and converging with their cutting edges toward said stem, a releasable spacer device for holding the cutting edges of said blades out of contact with said stem, and a tripping mechanism to release said cutting blades from said spacer device at the end of a predetermined pulling stroke of said pulling element, the cutting edges of said blades being spaced from the fulcrums of said blades outwardly away from the end of the pressure element, and said blades being turned inwardly by the engagement of the cutting edges of said blades with said stem at about the end of said pulling stroke by said pulling element and by the pressure exerted on said blades by said pressure element.

5. In a riveting apparatus for setting rivets of the type in which a stem is extended through a tubular rivet, the stem having a tail former at one end and having its other end extended beyond the rivet head, the combination with a pulling element and a pressure element of said apparatus of cutting blades fulcrumed on said pressure element, cutting edges on said blades spaced from said fulcrums toward the pressure end of said pressure element and between said fulcrums to be forced into said stem by the pulling of the stem and by the pressure of said cutting elements on the rivet head, and releasable means to hold said cutting blades inoperative during a predetermined stroke of said pulling element.

6. In a riveting apparatus for setting rivets of the type in which a stem is extended through a tubular rivet, the stem having a tail former at one end and having its other end extended beyond the rivet head, the combination with a pulling element and a pressure element of said apparatus, of cutting blades fulcrumed on said pressure element, cutting edges on said blades spaced from said fulcrums away from the pressure end of said pressure element and between said fulcrums to be forced into said stem by the pulling of the stem and by the pressure of said cutting elements on the rivet head, a spacer holding said blades spaced from said stem, and a releasing device for releasing said blades for cutting said stem after a predetermined stroke of said pulling element.

7. In a riveting apparatus for setting rivets of the type in which a stem is extended through a tubular rivet, the stem having a tail former at one end and having its other end extended beyond the rivet head, the combination with a pulling element and a pressure element of said apparatus, of cutting blades fulcrumed on said pressure element, cutting edges on said blades spaced from said fulcrums toward the pressure end of said pressure element and between said fulcrums to be forced into said stem by the pulling of the stem and by the pressure of said cutting elements on the rivet head, a spacer carried by said pulling element for holding said cutting blades spaced from said stem, and a tripping mechanism actuated by said pulling element after a predetermined stroke for removing said spacer from between said cutting elements and releasing said cutting elements for cutting said stem.

8. In a riveting apparatus for setting rivets of the type in which a stem is extended through a tubular rivet, the stem having a tail former at one end and having its other end extended beyond the rivet head, the combination with a pulling element and a pressure element of said apparatus, a pressure head on said pressure element, cutting blades fulcrumed on said pressure head and converging toward one another and toward said stem being forced into said stem by the force of engagement with the stem and by the force of pressure applied by said pressure element on said pressure head, and releasable means to hold said cutting blades out of engagement with said stem for a predetermined stroke of said pulling element.

9. In a riveting apparatus for setting rivets of the type in which a stem is extended through a tubular rivet, the stem having a tail former at one end and having its other end extended beyond the rivet head, the combination with a pulling element and a pressure element of said apparatus, a pressure head on said pressure element, cutting blades fulcrumed on said pressure head and converging toward one another and toward said stem being forced into said stem by the force of engagement with the stem and by the force of pressure applied by said pressure element on said pressure head, and releasable means to hold said cutting blades out of engagement with said stem for a predetermined stroke of said pulling element, and a releasing device actuated by said pulling element to release said releasable holding means at said predetermined stroke.

10. In a riveting apparatus for setting rivets of the type in which a stem is extended through a tubular rivet, the stem having a tail former at one end and having its other end extended beyond the rivet head, the combination with a pulling element and a pressure element of said apparatus, a pressure head on said pressure element, cutting blades fulcrumed on said pressure head and converging toward one another and toward said stem, the cutting edges of said cutting blades at the end of the pressure head where it is pressed against the rivet head being urged by the pressure exerted on said rivet head toward one another and into said stem, and releasable means to hold said cutting blades out of engagement with said stem during a predetermined stroke of said pulling element.

11. In a riveting apparatus for setting rivets of the type in which a stem is extended through a tubular rivet, the stem having a tail former at one end and having its other end extended beyond the rivet head, the combination with a pulling element and a pressure element of said apparatus, a pressure head on said pressure element, cutting blades fulcrumed on said pressure head and converging toward one another and toward said stem, the cutting edges of said cutting blades at the end of the pressure head where it is pressed against the rivet head being urged by the pressure exerted on said rivet head toward one another and into said stem, releasable means to hold said cutting blades out of engagement with said stem during a predetermined stroke of said pulling element, and adjustable tripping means to release said releasable holding means after said predetermined stroke of said pulling element.

CARL W. CHERRY.

REFERENCES CITED

The following references are of record in the file of this patent:

UNITED STATES PATENTS

| Number | Name | Date |
|--------|------|------|
| 2,183,543 | Cherry | Dec. 19, 1939 |

FOREIGN PATENTS

| Number | Country | Date |
|--------|---------|------|
| 371,817 | Italy | Aug. 5, 1939 |